United States Patent Office 3,480,450
Patented Nov. 25, 1969

3,480,450
CANNED CREAMED MEAT-CONTAINING FOOD PRODUCTS BY INCORPORATION THEREIN OF A WATER SOLUBLE ALGINATE AND A SOLUBLE MAGNESIUM SALT
Ray L. Edlin and James K. Rocks, San Diego, Calif., assignors to Kelco Company, San Diego, Calif., a corporation of Delaware
No Drawing. Filed Apr. 8, 1966, Ser. No. 541,091
Int. Cl. A23b 1/00, 3/00
U.S. Cl. 99—187          24 Claims

ABSTRACT OF THE DISCLOSURE

The process of preparing a canned, creamed, food product containing starch, a calcium source and meat, poultry, fish or broth thereof wherein part of the starch is replaced by a water soluble alginate and a somewhat water-soluble magnesium salt is added to enhance the formation of the calcium alginate gel, and the mixture is heated to at least 160° F.

---

This invention relates to canned food products and more particularly to those which are thickened with a starchy material. More specifically, this invention relates to such canned food products which contain meat, poultry, or fish, either as solids or in the form of broths.

As is well-known, a large and important sub-class of canned goods comprises various foodstuffs thickened with starchy material, such as starch and flour. Representative of these are creamed soups, such as cream of chicken, cream of asparagus, and cream of mushroom soups, the so-called New England type clam chowder, corn chowder, chow mein, chop suey, creamed tuna, creamed chicken, meat and fish stews, cream sauce, meat and poultry gravies, au gratin sauce and cheese based sauces and toppings, bisques, a la king and fricassee type products, puddings and cream type desserts, dessert sauces and fillings, and the like.

As set forth in co-pending U.S. patent application, Ser. No. 440,951, filed Mar. 18, 1965, and assigned to the assignee of the present application now U.S. Patent 3,257,214, considerable difficulties are encountered in the manufacturing of canned goods which are thickened with starchy material. In preparation of such goods, the product to be canned is heated to above the gelatinization temperature of the starch or flour employed so that the product may thicken to the extent required in he product to be produced. The product is then cooked as required and placed into cans which are sealed and then retorted to a temperature in the range of 230° F. to 250° F. Following the retorting operation, the processed cans are allowed to cool and are labeled and shipped. The thickening agent which is almost universally employed is a starch such as corn starch, waxy sorghum starch, waxy maize starch, potato starch, wheat starch, rice starch, tapioca starch, and the like, or a starchy flour such as wheat flour, rice flour, and the like. Any or all of these various starches or flours in any combination, will be referred to in the specification as "starchy material."

The processing of canned goods containing starchy material, as described above, involves treating the canned goods at temperatures in excess of at least 160° F. When subjected to such temperatures, the starchy material rapidly gelatinizes to produce a very viscous product. Such a product requires a conduction type of heating mechanism (as oposed to convection heating) and, therefore, requires a longer heating time.

A further problem in the production of starch-thickened canned goods results from the fact that the starchy material thickens the food mixture at the cooking, filling and retorting or processing temperatures all of which are above 160° F. Consequently, good heat transfer does not take place with the result that the product must be subjected to prolonged heating in order to insure that the material at the slowest heating point of the can has been heated to a sufficient degree to kill *Clostridium botulinum* or other harmful microorganisms which might be present. Such prolonged heating, in order to heat the material at the slowest heating point of the can, has a tendency to over-heat the material which is adjacent to the can surface such that the material in this region can suffer from over processing with a resultant decrease in quality with attendant undesirable flavor changes.

A solution to the aforementioned problems which are encountered in the processing of canned goods containing starchy material is afforded by the invention described in U.S. patent application, Ser. No. 440,951 (U.S. Patent 3,257,214). As there described, a portion of the starchy material is replaced by a water soluble alginate which is added to the food product at a temperature of at least 160° F. The food product contains calcium ions either as a result of milk products which are contained therein or as a result of a calcium salt which has been added and which releases calcium slowly to react with the alginate to form a calcium alginate gel.

The effect of the alginate is to allow the food product to remain in a fluid condition without any appreciable thickening while at the cooking, filling and retorting or processing temperatures above 160° F. While at these temperatures, the food product can be easily agitated and good convection heat transfer is obtained. This results in a shortening of the time required to reach temperature, a more rapid filling operation achievable with a less viscous product, and improved heat penetration throughout the body of the food product during retorting or high temperature processing. As the temperature of the food product in the filled cans drops appreciably below 160° F., the alginate commences to thicken yielding a product having the desired thickness when the temperature of the food product reaches, for example, room temperature.

In practicing the process described in prior U.S. patent application Ser. No. 440,951 (now U.S. Patent 3,257,-214), it has been observed that the process does not work as well in the canning of creamed foods containing poultry, meat, or fish, either in the form of solids or broths. For some reason, which is not understood, the canned product containing poultry, meat or fish is not thickened to the same degree as, for example, a thickened product containing only vegetables, such as cream of asparagus or cream of mushroom soups, corn chowder or the like.

An object of this invention is to provide a creamed food canning process in which the processing time is materially reduced.

Another object is to provide a creamed food canning process in which the consistency of the food product is relatively low during the cooking, filling, and retorting operations but reaches the desired consistency on cooling, which consistency is retained during subsequent storage and on subsequent reheating of the food product to serving temperatures.

A further object of the invention is to provide a food product of the type described and a process for its preparation which product contains poultry, meat, or fish, or a broth derived therefrom, which product has a relatively low viscosity during processing at high temperatures but which thickens while cooling to form a satisfactory creamed product.

Other objects will become apparent from a reading of the specification and claims which follow.

In accordance with the present invention, we replace a portion of the starchy material, for example, 15 to 85% of that used in the usual formulation of a canned creamed food product, which contains poultry, meat, or fish, with an alkali metal alginate and, in addition, we include a magnesium-containing salt which is somewhat soluble in water. The food product also contains calcium ions which are either derived from milk products which may be present therein or are derived from a calcium salt which has been purposefully added. Surprisingly, the presence of a magnesium salt enhances the ability of the alkali metal alginate to form a calcium alginate gel on cooling of the food product. This result is surprising inasmuch as magnesium will not by itself form insoluble gels with an alkali metal alginate, e.g., sodium alginate. Yet, its presence promotes the formation of a calcium alginate gel of the desired thickness even in the presence of poultry, meat, or fish or a broth derived therefrom which is present in the food product.

The creamed food products which contain poultry, meat or fish have a tendency to inhibit the formation of a calcium alignate gel on cooling of the food product to room temperature. The amount of such ingredients can vary from a small quantity to an appreciable amount such as 35 to 40% by weight of the total food product. As an example, chow mein contains approximately 6% meat whereas a beef stew can contain as much as 25% meat. The particular quantity of meat, poultry or fish present in the food product is not the concern of the present invention except insofar as their presence inhibits the formation of a calcium alginate gel having the desired thickness when the food product is cooled subsequent to heating to temperatures above 160° F. It should also be understood that our invention is concerned with the processing of food product which contain vegetables in admixture with poultry, meat or fish.

By poultry, meat or fish, we intend to include all varieties of these materials such as, for example, chicken, turkey, beef, pork, lamb, tuna, salmon, cod, and the like.

The creamed food product contains, in addition to the poultry, meat, or fish, a portion of a starchy material, as described previously, which can be varied to suit the taste of the consumer and the thickness of the desired product. The amount of starch contained in the food products produced by our invention is substantially less, for example, 15–85% less, than the amount of starchy material required in the usual formulation of a creamed food product. In general, the amount of starchy material present in the food products of our invention is in the range of about 0.5 to about 10% by weight. The water soluble alkali metal alginate will vary from about 15% to about 85% of the weight of the starchy material. Preferably the working range of alginate ranges from about 1/40% to about 1% of the total weight of the creamed food product.

The water soluble alginate which is employed may be any alkali metal alginate such as sodium alginate, potassium alginate, or even ammonium alginate. Sodium alginate is, however, preferred because of its lower cost and greater availability.

The magnesium salt which we employ can be any magnesium salt which is soluble to some extent in water. Typical of such salts are magnesium chloride, magnesium carbonate, magnesium oxide, magnesium sulfate, magnesium acetate, magnesium hydroxide, magnesium lactate, magnesium citrate and magnesium tartrate. The magnesium salt is present in an effective amount which is capable of producing a product having a Bostwich consistometer value of about 8 cms. or less in 30 seconds. In some cases the magnesium salt can be present in a relatively large quantity up to about 100% of the weight of the water soluble alginate.

A further essential in our invention is the presence of calcium ions within the food product. In certain cases, milk products will be included in the food product in sufficient concentration to provide an adequate calcium ion concentration for reaction with the alkali metal alginate to form a gel on cooling. In other cases, however, the food product may not contain a source of calcium ions or may contain an inadequate source of calcium ions. In this event, it is necessary to add a source of calcium ions in the form of a suitable calcium salt such as calcium chloride, calcium lactate, calcium gluconate, calcium citrate, anhydrous dicalcium phosphate, tricalcium phosphate, dicalcium phosphate dihydrate, calcium carbonate, calcium tartrate, and the like. The quantity of added calcium salt will depend upon a number of factors such as the quantity of calcium ions present as a result of the inclusion of milk products, the solubility of the calcium salt, and the ability of the calcium salt to ionize. The quantity of calcium salt can, of course, be caried by the food processer in relation to the properties, e.g., thickness, desired in the final food product. Thus, the quantity of calcium salt which is added can range from 0% in the case where an adequate calcium ion concentration is afforded by milk products present in the food up to about 70% of the weight of the alkali metal alginate as dicalcium phosphate dihydrate in the event that the food product does not supply any calcium ions. This corresponds to added calcium ion in an amount from 0 to about 17% by weight of the alkali metal alginate.

In certain cases, the food products produced according to our invention may ontain a calcium-binding salt which may be any of the so-called condensed sodium phosphates such as sodium hexametaphosphate, sodium tetraphosphate, tetrasodium pyrophosphate, and sodium tripolyphosphate or orthophosphates such as disodium phosphate, or even sodium carbonate or sodium citrate. The preparation of mixtures of alginates and calcium-binding salts is taught in U.S. Patent Nos. 2,097,228 and 2,485,934, the disclosures of which are incorporated herein by reference.

Oftentimes, a calcium-binding salt may not be required. As an example, the calcium-binding salt can be eliminated if milk products are absent and the added calcium salt is a salt of low water solubility. In this event, the calcium ions would be released slowly so that the calcium alginate gel would not form too quickly and thereby inhibit the food processing operations. In other instances, however, it would be desirable to employ a calcium-binding salt so as to tie up the calcium ions and release them at a controlled rate for formation of a calcium alginate gel. When employed, the calcium-binding salt can be present in a maximum amount corresponding to about 2 parts by weight for each 8 parts of the sodium or other alkali metal alginate.

A convenient way to add a calcium-binding salt is to make a dry mixture of it, the alginate (both in comminuted form), and a dispersing agent which may be an edible sugar, dried skim milk powder, a starchy material in powder form, or the like. This promotes the initial dispersion of the mixture when added to the food product during processing or when added to water to produce an intermediate slurry for subsequent addition to the food product. This procedure is taught in U.S. Patent No. 2,485,934. A suitable procedure is to use a portion of the starchy material included in the formulation of the creamed food product as a dispersion agent for dry mixing with the alkali metal alginate and calcium-binding salt.

One further variable which we have found to be of great importance in our process is pH control. Our process requires an essentially neutral environment with a pH ranging from about 5.5 to about 7.0. In some instances the pH may be more alkaline, but it is undesirable that the pH go much below 5.5. We have found that as the pH decreases below 5.5 our process becomes less effective.

In categorizing the body required of a satisfactory creamed food product produced according to our process, it is useful to refer to Bostwich Consistometer values. The Bostwich Consistometer is widely used by the food processing industry in defining the consistency of thickened food products. In use, the thickened food product is poured into a box-like cavity, one side of which is a gate. On raising of the gate, the thickened product flows out of the cavity and beneath an aperture. The distance which the food product flows in 30 seconds after the raising of the gate is measured in centimeters and this distance is the Bostwich Consistometer value for the food product.

To further illustrate our invention, there are presented the following examples in which all parts and percentages are by weight unless otherwise indicated.

Example I

To a No. 2 can was added 114 grams of diced chicken. Following the addition of the chicken, 200 grams of mixed vegetables were added which had been previously blanched at a temperature of about 190° F. for 3–5 minutes. The mixed vegetables were composed of potatoes, onions, carrots, celery, and peas. To the can was then added 6 cc. of an aqueous slurry containing dicalcium phosphate dihydrate. The slurry was made up by admixing 37.5 gams of dicalcium phosphate dihydrate with 162.5 cc. of water and, in commercial operation, the slurry is contained in a can filling device. After addition of the dicalcium phosphate dihydrate slurry to the can, 256 grams of a gravy mixture was added. The addition of the gravy mixture was done at a temperature of about 190° F. The gravy was made up by admixing 16 grams of sodium alginate, 25 grams of a modified waxy maize starch (Col Flo 67, National Starch Company( 3,9 grams of magnesium chloride hexahydrate, 0.2 gram of tumeric, 1549 grams of chicken broth, and 50.8 grams of assorted seasonings which were a combination of salt, monosidium glutamate, flavoring agents, etc. Following the addition of the gravy to the can, the can was closed and heated with agitation for about 11 minutes in a revolving retort at a retort temperature of 260° F. After cooling to room temperature, the Bostwich Consistometer reading of the resulting chicken stew was determined and found to be 4.5 cms.

Example I was repeated several times while varying the content of magnesium chloride hexahydrate in the gravy. It was found that the complete elimination of magnesium chloride hexahydrate from the gravy gave a product which was considerably thinner and had a Bostwich Consistometer reading of 21.25 cms. On raising the magnesium chloride hexahydrate level in the gravy to 0.97 grams, the product obtained had a Bostwich Consistometer reading of 16.75 cms. In a still further run, the magnesium chloride hexahydrate level in the gravy was raised to 1.95 grams and it was found that the Bostwich Consistometer reading was 7.25 cms.

In a further repetition of Example I, the gravy employed was composed as described in Example I with the exception that 4.72 grams of magnesium sulfate heptahydrate was employed in lieu of the 3.9 grams of magnesium chloride hexahydrate. The chicken stew which was obtained was found to have a Bostwich Consistometer reading of 8.25 cms.

In a still further test, Example I was repeated with the exception that 1.87 grams of magnesium carbonate was used in making the gravy. The chicken stew so obtained was found to have a Bostwich Consistometer reading of 4 cms.

The above data demonstrates the profound effect which a magnesium salt had on the viscosity of the chicken stew prepared according to Example I. Elimination of the magnesium salt from the stew resulted in greatly decreasing the thickness of the resulting product which gave a Bostwich reading more than four times that of the chicken stew where 3.90 grams of magnesium chloride hexahydrate was employed in composing the gravy.

Example II

A lamb stew was prepared by adding 142 grams of chopped lamb and 172 grams of hot blanched vegetables to a No. 2 can. There was then added to the can 6 cc. of a slurry composed of 50 grams of dicalcium phosphate dihydrate in admixture with 150 grams of water. At a temperature of about 190° F., 256 grams of a gravy were added. The gravy batch contained 13.6 grams of sodium alginate, 21.3 grams of a modified waxy maize starch (Col Flo 67), 77.6 grams of beef seasoning, 0.2 gram of turmeric, 0.26 cc. of Oleoresin paprika, 10 grams of tomato paste, 250 cc. of lamb broth and 1202 cc. of soft water. In preparing the gravy batch, a portion of the water, 80 ccs., was first blended with the starch while heating while the other ingredients were added to the remaining water, 1122 ccs., and mixed for 10–15 minutes to cause the sodium alginate to dissolve. Following this, the starch slurry was added to the remaining ingredients, and the gravy was heated to a temperature of 160° F. or above prior to addition to the heated can.

After addition of the gravy, the can was closed and cooked for about 11 minutes in a revolving retort at a retort temperature of 260° F. The can was then allowed to cool to room temperature. Two cans of lamb stew prepared in this manner were each checked to determine their Bostwich Constistometer values. The average Bostwich Consistometer reading for the two cans was 15 cms.

Example II was repeated in the preparation of four cans of a meatless stew. Each can contained 314 grams of blanched vegetables and 256 grams of gravy. The average consistometer reading for the four cans was 5.8 cms.

Example II was then repeated a further time to prepare a lamb stew containing magnesium chloride hexahydrate. The stew was prepared as before with the exception that the gravy batch which was prepared contained 5.5 grams of magnesium chloride hexahydrate. Of three cans of lamb stew prepared in this manner, the average Bostwich Consistometer reading was found to be 4.75 cms.

In a still further test performed in the manner of Example II, three cans of meatless stew were prepared with each can containing 314 grams of blanched vegetables and 256 grams of gravy. The gravy batch was prepared in the manner set forth in Example II with the exception that it contained 5.5 grams of magnesium chloride hexahydrate. The meatless stew prepared in this manner was found to have an average Bostwich Consistometer reading of 3 cms.

Example III

A pork stew was prepared by adding 114 grams of diced pork to a No. 2 can followed by the addition of 200 grams of hot blanched vegetables to the can. There was then added 6 cc. of a dicalcium phosphate dihydrate slurry composed of 37.5 grams of dicalcium phosphate dihydrate and 162.5 cc. of water. At a temperature of about 190° F., 256 grams of a gravy were added. The gravy was composed of 16 grams of sodium alginate, 25 grams of a modified waxy maize starch (Col Flo 67, National Starch Company), 50.8 grams of seasoning, 0.2 gram of tumeric, 204 cc. of pork broth and 1345.2 cc. of soft water. The gravy batch was prepared as in the previous examples by taking a portion of the soft water, in this case 70 cc., and mixing it with a starch to form a starch slurry which was then added to the other ingredients. The gravy was heated with mixing to a temperature of about 190° F. prior to addition to the can. After cooking the stew in a revolving retort for about 10 minutes at a retort temperature of 260° F., it was cooled to room temperature. Three cans of pork stew prepared in this manner were found to have an average Bostwich Consistometer reading of 15.25 cms.

Example III was repeated to prepare three cans of a meatless stew. Each No. 2 can contained 314 grams of blanched vegetables and 256 grams of the gravy described in Example III. On testing the three cans of meatless stew prepared in this manner, the average Bostwich Consistometer reading was found to be 15.5 cms.

Example III was again repeated to prepare a pork stew in which 3.9 grams of magnesium chloride hexahydrate was added to the gravy batch which was otherwise as described in Example III. The consistometer reading of the resulting pork stew was found to be 3 cms.

In a still further repetition of Example III, three cans of meatless stew were prepared with each can containing 314 grams of blanched vegetables and 256 grams of gravy. The gravy batch employed was prepared in the same manner as in Example III with the exception that 3.9 grams of magnesium chloride hexahydrate were added to the gravy. Of the three cans of meatless stew prepared in this manner, the average observed Bostwich Consistometer reading was 1.25 cms.

As illustrated by the foregoing examples, the addition of a magnesium salt to a canned creamed food product containing a soluble alginate and a source of calcium ions greatly improves the consistency of the resulting product. As demonstrated by the examples, our invention finds greatest use in the preparation of canned creamed food products containing meat, poultry or fish. However, in many instances our invention finds application to improving the consistency of meatless products also.

In the forgoing examples, the gravy was added at a temperature of about 190° F., which is a preferred temperature for the addition. The gravy may be added at other temperatures, however, so long as the addition temperature is in excess of 160° F. As illustrated, the calcium salt, e.g., dicalcium phosphate dihydrate, is generally added in the form of a water slurry and is added separately from the gravy. However, the calcium salt may be incorporated into the gravy which is then added to the can or cooking vessel. This procedure is generally satisfactory for small scale canning operations.

The amount of calcium present in the gravy, or in the gravy and calcium slurry if the calcium is added separately, ranges from about 12 to about 150% of the calcium contained in an equal volume of whole milk. The quantity of starch generally employed in the gravy is sufficient to give the gravy an initial body ranging from 5 to 50 cps. as measured on a Brookfield Viscometer at 60 r.p.m. with a No. 1 spindle. By initial body, we mean the viscosity of the gravy prior to any prolonged cooking. The starch content of the gravy can, of course, be higher so as to give a thicker body to the gravy, such as 100 cps. Preferably, however, the initial body of the gravy is 10 to 20 cps.

We claim:

1. In the process of preparing a canned creamed food product containing meat, poultry, or fish, or a broth derived therefrom and including amylaceous ingredients, the improvement comprising bringing such a food product and in which calcium is present to a temperature of at least 160° F. and incorporating therewith sodium alginate, a calcium binding salt, and a soluble magnesium salt, said sodium alginate being present within the range of $\frac{1}{40}$% to 1% by total weight of said product, said calcium binding salt being present within the range of from about 10% to about 25% by weight of said alginate, said product containing starchy material within the range of 0.5% to 10% by total weight of said product, and said magnesium salt being present in an effective amount capable of producing a product having a Bostwich Consistometer value of 8 cms. or less in 30 seconds, and subsequently cooling said product to a temperature below 160° F.

2. In the process of preparing a canned creamed food product of the type including a given amount of starch ingredients, together with meat, poultry or fish, or a broth derived therefrom, said process comprising the steps of raising the temperature of such a food product containing calcium to a temperature of at least 160° F. in which the said amount of starch in said food product has been reduced to retard retrogradation and a portion of the said reduced amount of starch in said food product replaced by adding thereto a mixture of a water soluble alginate and a calcium binding salt and a soluble magnesium salt, said water soluble alginate being present within the range of $\frac{1}{40}$% to 1% of the total weight of said canned creamed food product, said calcium binding salt being present within the range from about 10% to about 25% by weight of said water soluble alginate, and said magnesium salt being present in an effective amount capable of producing a product having a Bostwich Consistometer value of 8 cms. or less in 30 seconds, and thereafter cooling said product to a temperature below 160° F.

3. The process in accordance with claim 2 wherein said water soluble alginate, said calcium binding salt, and said soluble magnesium salt are added in the form of a gravy to said food product which gravy also contains starch, wherein the calcium content of said gravy at a time prior to the reaction thereof with said calcium binding salt ranges from about 12 to about 150% of the calcium content of a volume of milk equal to the volume of said gravy.

4. The process in accordance with claim 2 wherein said alginate is sodium alginate.

5. The process in accordance with claim 2 wherein said alginate is sodium alginate and said calcium binding salt is chosen from the group consisting of the sodium and sodium-hydrogen salts of orthophosphoric, tetraphosphoric, pyrophosphoric, hexametaphosphoric, tripolyphosphoric, citric, lactic, gluconic and carbonic acids.

6. The process of claim 2 wherein said canned, creamed, food product contains chicken.

7. The process of claim 2 wherein said canned, creamed, food product contains pork.

8. The process of claim 2 wherein said canned, creamed, food product contains lamb.

9. In the process of preparing a canned creamed food product of the type including starch in the formulation thereof to give body to said food product at the time of use by the consumer thereof, which product contains meat, poultry or fish or a broth derived therefrom, the improvement comprising the steps of formulating such a product with a reduced quantity of starchy material within the range of 0.5% to 10% of the total weight of said product to reduce the consistency and body of the said product during a heat processing step at a temperature of at least 160° F. to retard retrogradation and including in the composition of said food product during said high temperature processing an amount of water soluble alginate in the range of $\frac{1}{40}$% to 1% by total weight of said product, a sufficient quantity of a calcium salt selected from the group consisting of dicalcium phosphate, tricalcium phosphate and dicalcium phosphate dihydrate to slowly react with said alginate by the formation of a calcium alginate gel therein after the heat processing step at a temperature in excess of 160° F. and a soluble magnesium salt in an effective amount capable of producing a product having a Bostwich Consistometer value of 8 cms. or less in 30 seconds, and cooling of the said product to a temperature below 160° F.

10. In the process of preparing a canned creamed food product of the type including starchy material in the formulation thereof, which product contains meat, poultry or fish or a broth derived therefrom, the improvement comprising the steps of reducing the normal amount of starch called for in said formulation to give a given desired body to said food product, and incorporating therewith a water soluble alginate in the amount of $\frac{1}{40}$% to 1% by weight of said product, placing the said food product in a can together with an amount of dicalcium phosphate dihydrate sufficient to react with a substantial portion of said water soluble alginate to slowly form a calcium alginate gel, adding a soluble magnesium salt in an effective amount capable of producing a product having a Bostwich Consistometer value of 8 cms. or less in 30 seconds, closing the said can and subjecting the closed can and contents to a cooking and sterilization process at a temperature in excess of 160° F. and prior to any substantial reaction between the said alginate and calcium salt with resulting formation of calcium alginate gel in said can.

11. The process of claim 9 in which the water soluble alginate is sodium alginate and the calcium salt is dicalcium phosphate dihydrate.

12. The process of claim 10 in which the water soluble alginate is sodium alginate.

13. The process of claim 10 in which the water soluble alginate is an ammonium alginate.

14. The process of claim 10 in which the soluble magnesium salt is selected from the group consisting of magnesium chloride, magnesium carbonate, magnesium oxide, magnesium sulfate, magnesium acetate, magnesium hydroxide, magnesium lactate, magnesium citrate and magnesium tartrate.

15. The process of claim 10 wherein said magnesium salt is magnesium carbonate.

16. The process of claim 15 wherein said magnesium salt is magnesium chloride.

17. The process of claim 15 wherein said magnesium salt is magnesium sulfate.

18. A canned, creamed, food product resulting from the process of claim 10.

19. In the process of preparing a canned creamed food product of the type including starchy material incorporated in the gravy used in the formulation thereof and containing meat, poultry or fish or a broth derived therefrom, the improvement comprising adapting said food product for processing in a continuous agitating spiral roll retort comprising the steps of reducing the amount of starch called for in said formulation to give an initial body to the gravy employed in said food product within a viscosity range of 5 to 50 cps. as measured on a Brookfield viscometer at 60 r.p.m. with a Number 1 spindle, and incorporating therewith a water soluble alginate in the amount of $\frac{1}{40}$% to 1% by weight of said product, and placing said food product in a can together with a source of calcium in an amount and in a form that will react with a substantial portion of said water soluble alginate to slowly form a calcium alginate gel, adding a soluble magnesium salt in an effective amount capable of producing a product having a Bostwich Consistometer value of 8 cms., or less, in 30 seconds, closing the said can and subjecting the closed can and contents to an agitation type cooking and sterilization process at a temperature in excess of 200° F. and prior to any substantial reaction between the said alginate and calcium source with resulting formation of a calcium alginate gel in said can.

20. The process of claim 19 in which the said viscosity range is 10 to 20 cps.

21. The process of claim 19 in which the source of calcium is dicalcium phosphate dihydrate.

22. The process of claim 19 in which the water soluble alginate is sodium alginate and in which the source of calcium is dicalcium phosphate dihydrate.

23. The process of claim 19 in which a calcium binding salt is present in a range of from 10% to about 25% by weight of the water soluble alginate.

24. The process of claim 19 in which the source of calcium is milk.

References Cited

UNITED STATES PATENTS 3,257,214  6/1966  McDermott _____ 99—182

A. LOUIS MONACELL, Primary Examiner

U.S. Cl. X.R.

99—124, 182, 188